N. ZAM.
GAS RANGE LIGHTING APPLIANCE.
APPLICATION FILED JULY 31, 1917.
1,271,822.
Patented July 9, 1918.
2 SHEETS—SHEET 1.
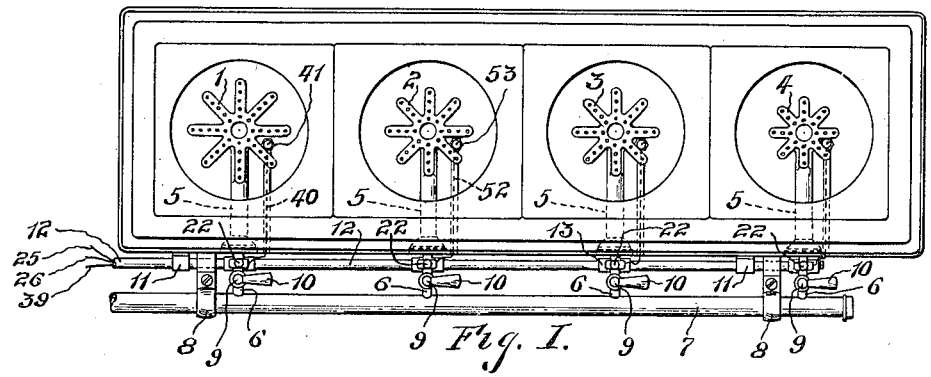
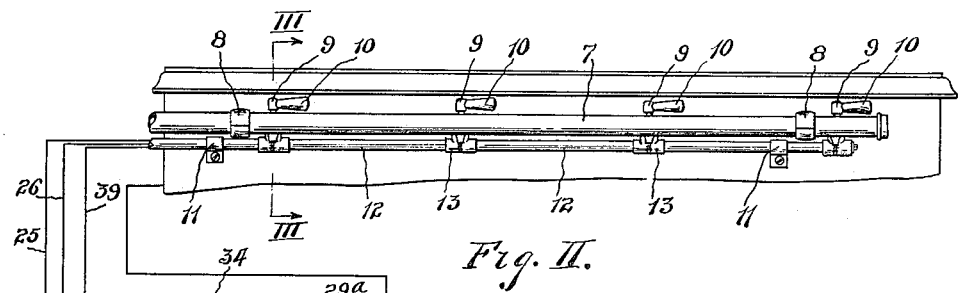
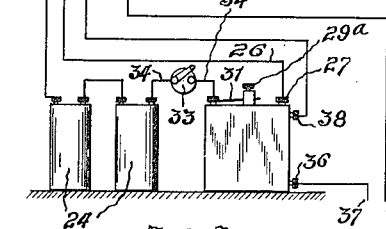
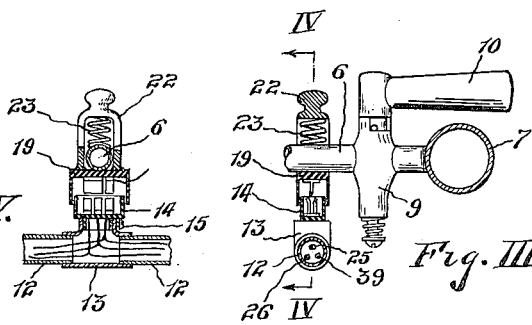
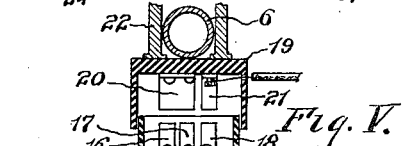
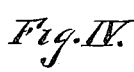
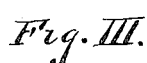
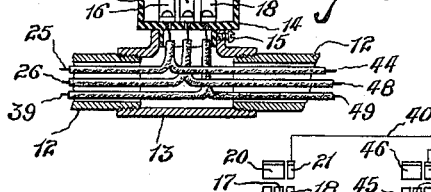
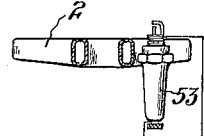
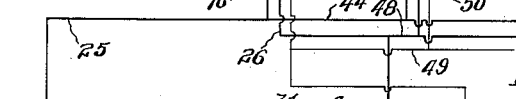
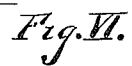
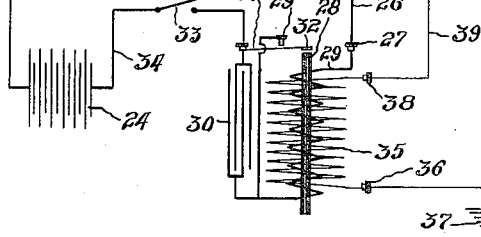
Inventor:
Nicholas Zam
by his atty N. ZAM.
GAS RANGE LIGHTING APPLIANCE.
APPLICATION FILED JULY 31, 1917.
1,271,822.
Patented July 9, 1918.
2 SHEETS—SHEET 2.
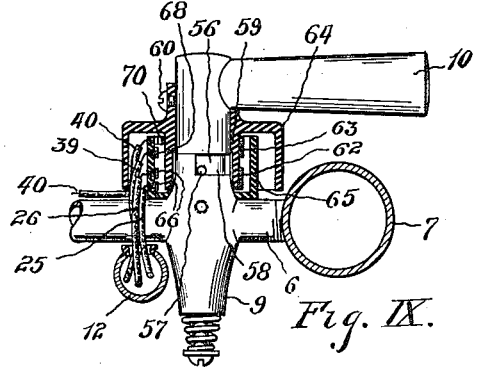
Fig. IX.
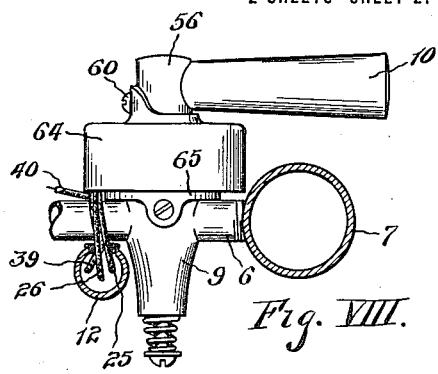
Fig. VIII.
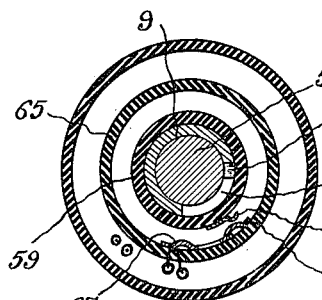
Fig. X.
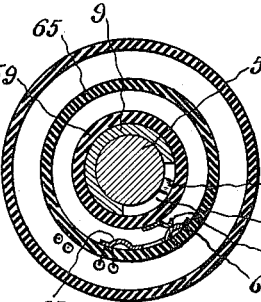
Fig. XI.
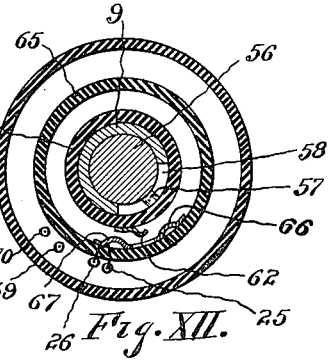
Fig. XII.
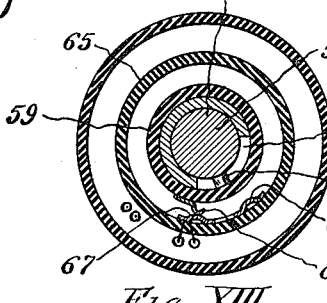
Fig. XIII.
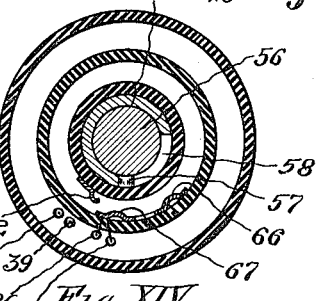
Fig. XIV.
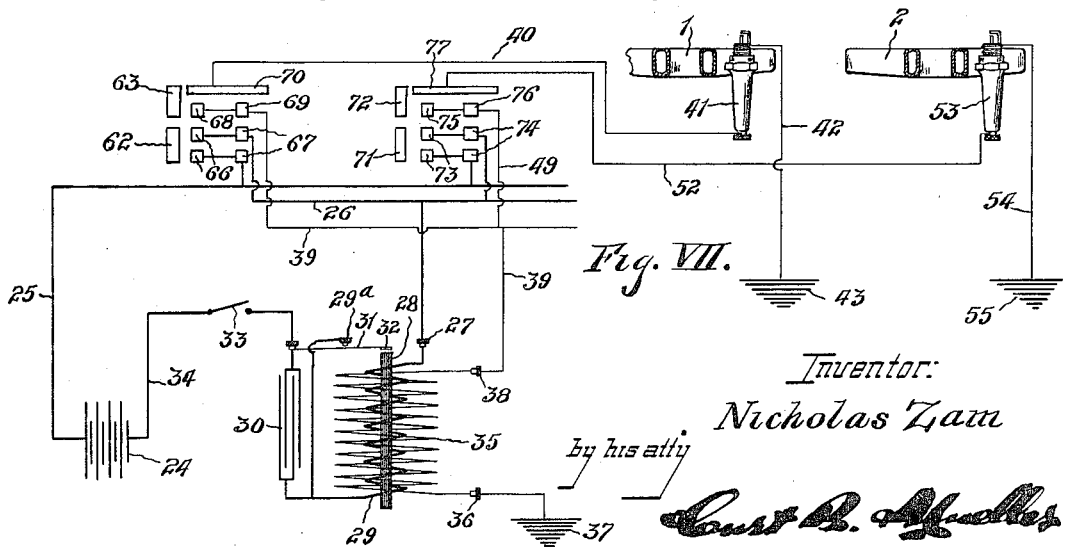
Fig. VII.
Inventor:
Nicholas Zam
by his atty

UNITED STATES PATENT OFFICE.

NICHOLAS ZAM, OF CLEVELAND, OHIO.

GAS-RANGE-LIGHTING APPLIANCE.

1,271,822.  Specification of Letters Patent.  Patented July 9, 1918.

Application filed July 31, 1917. Serial No. 183,803.

*To all whom it may concern:*

Be it known that I, NICHOLAS ZAM, a subject of the King of Hungary, residing at 4161 East 100th St., city of Cleveland, in the county of Cuyahoga and State of Ohio, have invented a new and useful Improvement in Gas-Range-Lighting Appliances, of which the following is a specification, the principle of the invention being herein explained and the best mode in which I have contemplated applying that principle, so as to distinguish it from other inventions.

The supposed invention of this application pertains to a gas-range lighting appliance and more particularly to an electrical system adapted to deliver a spark in ignitible proximity to a fuel burner.

My object, besides designing a feasible and economical arrangement, has been to provide a readily accessible control and one which can be easily manipulated indeed automatically actuated whenever the gas valve is opened. Incidental objects have been to furnish the spark somewhat prior to full opening of the valve, to cause it to cease when the valve is entirely open and to cause it to again spark at the nearly closed position of the valve whereby to act as an alarm whenever the operator actuated the parts with the intention of entirely cutting off the fuel.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawings:

Figure I is a top plan view of a gas-range showing four burners, fuel connections thereto and a part of the electrical system embodying my invention.

Fig. II is an elevation of Fig. I with the addition of the requisite parts of the electrical system.

Fig. III is an enlarged partial section on line III—III of Fig. II the valve appearing in elevation and turned through an angle of ninety degrees.

Fig. IV is a transverse section on line IV—IV of the manual control depicted in Fig. III.

Fig. V is a further enlarged view like but of only a portion of Fig. IV.

Fig. VI is a diagrammatic view of my complete invention such as I have intended to be subject to duplex manipulation.

Fig. VII illustrates the wiring diagram of any preferred adaptation wherein the ignition of the gas burner may be automatically accomplished by the actuation of the valve.

Fig. VIII is an enlarged elevation of the valve and switch according to such preferred modification.

Fig. IX is a view similar to Fig. VIII partially sectioned to disclose the character of switch.

Figs. X to XIV inclusive are horizontal sections of the switch showing its positions when the valve is closed, a little open, half open, three-quarters open and full open respectively.

In Fig. I is seen the top of a gas-range equipped with gas burners 1, 2, 3 and 4. Leading to each of the burners is a mixing tube 5 with four tributaries 6 connected with the main gas pipe 7. The latter is supported by a pair of brackets 8. Each of the tributaries 6 is provided with a valve 9 having an operating handle 10. Supported by suitable brackets 11 is an assembled conduit composed of pipe sections 12 and T's 13 each of which carries above an insulated drum 14 removably secured thereto by means of screws 15. Interiorly the drum carries a pair of terminals 16 and 17, which, as will hereinafter appear, belong to the primary circuit of an induction coil. Also located in each of the drums 14 is a third terminal 18 which belongs to the secondary circuit of such coil. Mounted upon each of the drums 14 so as to be in exterior telescopic connection therewith is a hollow member 19 provided interiorly with a terminal 20 adapted to come in contact with each of the contacts 16 and 17, and also a terminal 21 adapted to come in contact with the terminal 18. Secured to each of the members 19 is a structure 22 which straddles one of the tributaries 6 as is clearly shown in Fig. IV. Interposed between each of the tops of the structures 22 and their inclosed tributaries 6 is a compression spring 23 adapted normally to hold the tops of the members 19 against the bottom of the tributaries 6 and thereby hold the terminals 20 and 21 out of contact with the terminals 16, 17 and 18. As will be readily understood a manual depression of the structures 22 acts to bring the terminals in engagement with each other.

The electrical system as diagrammatically illustrated in Fig. VI includes a battery 24 and lead wire 25 which is connected to the terminal 16 leading from the terminal 17 to the wire 26 which is connected to a terminal 27 and thence with an induction coil which in turn includes a core 28 and a primary winding 29 thereabout with the opposite end of which a terminal 29ª as well as a condenser 30 is connected. A vibrator 31 carrying an armature 32 contacts with terminal 29ª and is suitably connected with a point beyond the condenser 30 whence the current may return to the battery across a switch 33 and lead wire 34. The induction coil also includes a secondary winding 35 which incloses the primary winding and is connected at one end with a terminal 36 and thence to a ground 37. At its other end the secondary winding is connected with a terminal 38 which is connected to the terminal 18 by the wire 39. The wire 40 connects the terminal 21 with a spark plug 41 which is fixed in ignitible proximity to the burner 1. The plug 41 is also connected by means of the wire 42 with a ground 43.

When it is desired to have a gas flame at the burner 1 the fuel is first supplied by turning the handle 10 whereupon a manual depression of the structure 22 brings the contacts 20 and 21 into engagement with the pair of contacts 16 and 17 and the contact 18 respectively. The flow of current resulting from the closed circuit may be traced as follows: Starting at the battery 24 along the wire 25 successively through the terminals 16, 20 and 17 the current flows along the wire 26 through the primary winding 29 and back to the battery. In the meantime the condenser serves to choke the spark and a current is induced in the secondary winding 35 which flows along the wire 39 across the contacts 18 and 21 thence along the wire 40 to the spark plug 41 by means of which the flow of gas is promptly ignited.

Each individual burner appliance operates on the same principle but the operation of one additional, namely, that appliance which is associated with the burner 2 will be described. Assuming the circuit of the burner 1 to be open and the circuit of burner 2 to be closed current will flow from the battery 24 along the wire 25, along the wire 44 to the terminal 45 through the movable terminal 46 to the terminal 47 and thence along the wire 48 to meet the wire 26 and pass through the primary winding as before explained. The secondary current thus induced again first flows along the wire 39 but in this instance continues along the wire 49 thence through the terminal 50 and 51, along the wire 52 to another spark plug 53 from which a wire 54 leads to its ground 55.

The preferred embodiment of my invention, as illustrated on Sheet 2, consists of a modification such that the gas igniting spark is automatically produced whenever the gas valve is operated. In addition I have contrived to have such spark intermittent during the range of movement of the valve so that the spark occurs just after the valve is very slightly opened and again just before the valve is entirely opened. The reason for such an arrangement will be presently explained.

The valve includes in its structure a stem 56 carrying a stop 57 which is movable in a slot 58 fashioned in the valve body and so designed that the stop engages with the ends of the slot when the valve is fully opened or entirely closed. The handle part of the stem carries a structure including a drum 59 detachably secured thereto by means of a screw 60. The drum carries exteriorly a primary contact 62 and a secondary contact 63, the former being shown in Figs. VII and IX to XIV inclusive where the latter appears to view only in Figs. VII and IX. The detachable structure also includes an annular flange 64 of considerably larger diameter than the drum 59 as appears in Figs. IX to XIV inclusive. The purpose of the flange 64 is to prevent accidental contact of the fingers of the operator with the electrical terminals. Secured to the valve body and projecting upwardly between the drum 59 and flange 64 is an annular member 65. This member is spaced from the drum 59 and flange 64 and carries a pair of adjacent contacts 66 adapted to be simultaneously rubbed by the primary contact 62 just after the valve commences to open as is shown in Fig. XI. The member 65 carries also another pair of contacts 67 adapted to be simultaneously engaged by the primary contact 62 just prior to the valve assuming its full open position as shown in Fig. XIII. The member 65 furthermore carries a terminal 68 shown in Figs. VII and IX which is correspondingly located as are the contacts 66 so that it is adapted to be engaged by the secondary contact 63 when the valve is in the position shown in Fig. XI. Likewise, another contact 69 on the member 65 and shown in Fig. VII corresponds in position to that of the contacts 67 so that it may be engaged by the secondary contact 63 when the valve is nearly open or in the position of Fig. XIII. Inasmuch as the manner of effecting contact between the secondary contact 63 successively with the contacts 68 and 69 is identical with the manner in which the primary contact 62 successively engages the pairs of contacts 66 and 67 the same has not been separately illustrated. A collector ring 70 shown in Figs. VII and IX is likewise adapted to be engaged by the secondary contact 63 to permit the high potential current to flow in the same manner to the wire 40 and thence to the spark plug 41. In operation, as the valve handle 10 is turned from closed position in the direction of opening the primary and secondary contacts 62 and 63 engage with the pair of contacts 66 and with the contact 68 and ring 70 respectively, thus allowing the current from the battery to flow through the primary coil to induce a current in the secondary coil which after flowing through the wire 39 passes from the contact 68 through the secondary contact 63 to the collector ring 70 and thence along the wire 40 to the spark plug 41. The spark thus produced is not intended to be effectual, that is, serve any purpose during the movement of the valve toward open position; only as an alarm when the valve is being returned toward closed position so as to preclude by its warning the possibility of a failure to entirely close the valve. As the valve approaches its full open position the primary contact 62 and secondary contact 63 presently engage with the pair of contacts 67 and the contact 69 and ring 70 respectively so that the spark is again produced in the same way causing the flow of gas to become ignited. Thereafter, when the stop 57 reaches the limit of its travel the movable contacts will have ceased to be in engagement as is shown in the full open position of the valve represented by Fig. XIV.

When it is desired to operate the valve for the burner 2 the flow of current from the battery at the initial closing of the circuit or during the position of the parts shown in Fig. XI is controlled by movable primary contact 71 and movable secondary contact 72 which permit the primary to flow across the contacts 73 or the contacts 74 and across from either the near open contact 75 or the near closing contact 76 to the collector ring 77 respectively whence the flow of current is along the wire 52 to the spark plug 53. It will be seen therefore that during the operation of any particular valve a spark is delivered during two momentary positions, one of which is to light the fuel and the other of which is to furnish a warning that the valve is not entirely closed.

I claim:—

1. A gas-range lighting appliance comprising a burner, a valve having a limited range of movement for controlling the supply of fuel thereto, and an electrical device positively controlled by the movement of said valve in one direction for successively delivering sparks in ignitible proximity to said burner and at predetermined points with reference to the limits of movement of said valve.

2. A gas-range lighting appliance comprising a burner, a rotary valve having a limited range of movement for controlling the supply of fuel thereto, and an electrical system including different engageable sets of contacts, such engagements being controlled by the movement of said valve for successively delivering sparks in ignitible proximity to said burner just prior to the time the valve reaches one of its operative limits and just after the time it leaves the other limit of its movement.

3. A gas-range lighting appliance comprising a burner, a rotary valve for controlling the supply of fuel thereto, means for limiting the movement of said valve in both directions, a member movable in unison with said valve and provided with a contact, a support carried by said valve and provided with a pair of contacts definitely arranged with reference to the limits of movement of said valve, said movable contact adapted to successively engage said pair of contacts, and an electrical system including a spark plug at said burner and connected with said contacts.

4. A gas-range lighting appliance comprising a burner, a rotary valve having stationary and movable parts for controlling the supply of fuel thereto, a drum secured to said movable valve part and an electrical system including; a source of current, an induction coil primary and secondary contacts upon said drum and also upon said stationary valve part, and a spark plug located at said burner and connected to one of said secondary contacts.

5. A gas-range lighting appliance comprising a burner, a valve having stationary and movable parts for controlling the supply of fuel thereto, means for limiting the movement of said valve in both directions, and an electrical system including; a source of current, an induction coil primary and secondary contacts upon each of said valve parts, a plurality of sets on one of said parts being definitely arranged with reference to the limits of movement of said valve, another set of contacts on the other of said parts being adapted to successively engage said plurality of sets of contacts respectively, and a spark plug located at said burner and connected to a secondary contact of each of said definitely arranged sets whereby to furnish a spark at predetermined intervals during the movement of said valve.

Signed by me, this 20th day of July, 1917.

NICHOLAS ZAM.